US008328478B2

(12) United States Patent
Hawkins

(10) Patent No.: US 8,328,478 B2
(45) Date of Patent: Dec. 11, 2012

(54) GANTRY PALLET

(76) Inventor: Charles Lloyd Hawkins, Green Cove Springs, FL (US)

( * ) Notice: Subject to any disclaimer, the term of this patent is extended or adjusted under 35 U.S.C. 154(b) by 622 days.

(21) Appl. No.: 12/589,095

(22) Filed: Oct. 19, 2009

(65) Prior Publication Data

US 2011/0089132 A1 Apr. 21, 2011

(51) Int. Cl.
*B60P 7/00* (2006.01)

(52) U.S. Cl. ........................................................ 410/46

(58) Field of Classification Search ................ 410/4, 35, 410/44, 46, 120, 121; 206/600; 220/1.5; 108/53.1, 53.5, 55.1, 56.1; 248/346.02, 346.03, 248/346.3

See application file for complete search history.

(56) References Cited

U.S. PATENT DOCUMENTS 2,828,931 A * 4/1958 Harvey .......................... 410/46
7,131,803 B2 * 11/2006 Guarisco et al. ................ 410/35

* cited by examiner

*Primary Examiner* — Stephen Gordon

(57) ABSTRACT

The gantry pallet and allweather cover described includes, in its preferred embodiment, many improvements over the currently applied methods of storing, transporting and shipping the U.S. Navy's steam tube Gantry Cranes and accompanying appurtenances. Further included are lifting plates for safely lifting and/or handling and/or safely transporting the gantry pallet and allweather cover by a variety of methods. Another improvement is a provision for ridged, moisture barrier, noncorrosive cover that attaches to and seals against the gantry pallet frame. Another improvement involves a provision for on and off loading that allows substantial improvement in the speed of set-up and the safety in which, but not limited to, the U.S. Navy steam tube Gantry Cranes and accompanying appurtenances is applied to an aircraft carrier's catapult steam tubes. This invention will reduce the man hours needed to set-up, remove and install an aircraft carriers catapults steam tubes while protecting the gantry crane from the elements thus prolonging the life of the gantry crane and accompanying appurtenances.

2 Claims, 3 Drawing Sheets

Gantry Pallet
(Allweather Cover Installed)

Gantry Pallet
(Allweather Cover Removed)

Allweather Cover

Enlargement of Underside, Perimeter Gasket

Gantry Pallet
(Allweather Cover Installed)

GANTRY PALLET

FEDERALLY SPONSORED RESEARCHED

Not Applicable.

SEQUENCE LISTING OR PROGRAM

Not Applicable

BACKGROUND

1. Field of Invention

This invention relates to a gantry pallet for, but not limited to, transporting, storing and protecting the U.S. Navy's, steam tube gantry crane. The steam tube gantry crane is designed to reposition by rising and lowering an aircraft carrier's catapult steam tube; a critical component of the launch process, as it is removed, overhauled and replaced by manufacturing artisans.

2. Summary

A conventional catapult steam tube removal team consists of one crane and operator, one forklift and operator, a minimum of 30 men, numerous nylon slings, wooden pallets, dunnage, torque wrenches and approximately twelve foot on either side of the launch trough steam tube for maneuvering. Numerous person-hours are required to both set-up to remove or to replace the steam tubes. The aircraft carrier's catapult steam tube assembly is required to be either lowered or lifted evenly to prevent damage to the steam tube seals. The steam tubes are assembled in twelve-foot sections spanning the length of the Aircraft carrier's deck.

Post disassembly from the aircraft carriers steam system and post removal from within the aircraft carriers launch trough, the steam tube gantry cranes are individually removed from a storage area that is approximately 4,000 sf. The gantry crane appurtenances: chains, wrenches, fastening devices and torque wrenches are removed from a separate twenty-foot long container, stacked on pallets, individually raised and set upon the ship. Seamen center the steam tube gantry crane's hoisting cable over the steam tube prior to the gantry crane's cable attaching to the steam tube.

Once the gantry cranes are attached to the steam tube, the Seamen mount the gantry crane, attach the cable wench handles and wind up the cable to a prescribe tension. After all the gantry cranes cables are in tension one seaman sounds a whistle and at the sounding each of the 30 seamen rotates his gantry crane's wench one revolution. This sounding and wench rotation is repeated until the entire length of the aircraft carrier's catapult steam tube assembly is raised out of the catapult launch trough. After the steam tubes are removed from the catapult steam trough, gantry cables disconnected and the twelve-foot sections are palletized and removed the gantry cranes are individually moved away from the catapult steam trough, lowered off the ship and stored outside. The gantry crane appurtenances are then gathered, returned to a pallet and offloaded to a waiting twenty-foot long container.

It is not only during on and off loading that damage occurs to the gantry cranes but also during transportation to the storage area. Because the gantry cranes are top heavy, they easily topple over and sustain damage to their stainless steel cables and to the gears that operate the wench. Because the gantry cranes are stored outside, they are not protected from the elements and frequently sustain rain damage as well as lubrication contamination from wind borne debris such as dirt and dust. While the wench portion of the gantry crane can be covered, the covers often are blown off during periods of high wind resulting in water damage. These covers, once separated from the gantry crane are often lost, stored in a non-descript place or used as parts bags for the gantry cranes appurtenances such as nuts and bolts. Approximately 4,000 square foot of area is needed to store the gantry cranes and a twenty-foot long by eight-foot wide container is required to store the accompanying appurtenances. Once dockside, at the aircraft carriers edge, the time required to gather the gantry cranes, appurtenances and on-load them is 12 hours. Post repairing the catapults steam tube the entire process of on and off loading of the gantry cranes is repeated. The current methodology of loading the gantry cranes on and off and that of the gantry crane storage is both time consuming and damaging to the gantry cranes.

3. Prior Art

While there exist devices such as but not limited to U.S. Pat. Nos. 2,828,931 & 7,131,803, they all have similar deficiencies. Particularly '931 lacks a storage locker for the storage of small nuts and bolts, and the underside of '931 does not have a no-marring surface so it would mar and damage an aircraft carriers deck, also '931 is neither stackable when use as described nor is '931 able to create a weather tight seal when used as described. Similarly, '803 contains many of the same deficiency, no storage locker for storage of small nuts and bolts, underside of frame is marring and thus damaging to an aircraft carriers deck when used as described and there does not exist a structure for making a weather tight seal to protect the contents of '803. Noted are the single directional fork pockets on '931 and '803; this allows forklift loading in one direction, which is a deficiency. Also, neither '931 nor '803 contain self-closing access panels for quick access to stored components. Additional deficiencies found in both '931 and '803 are neither contains a tie-down for use on an aircraft carrier flight deck nor does '931 or '803 have a single crane lifting lug. Without a tie down specifically designed to attach '931 or '803 to said deck, said '931 and '803 become projectiles sliding around said deck during rough seas. The lack of a single crane lift lug implies that many slings or connections must be made to lift and move '931 or '803 without a forklift. As cited, neither '931 nor '803 are particularly suited for use on an aircraft carrier as a device to transport, store, or shield from moisture said gantry cranes.

Using my invention a removal team, such as but not limited to, an aircraft carriers catapult's steam tube removal team will no longer need the many machines and operators once required. The removal team can now load 30 gantry cranes in six lifts. Because of the built in upper and lower appurtenance storage locker(s) the searching for lost bolts or tools will be eliminated, each pallet of cranes will have the appurtenances needed moved along with the gantry cranes and be within easy reach.

My invention, primarily for but not limited to, an aircraft carriers catapult steam tube gantry crane is also used to protect the gantry crane from the elements, thus limiting the damage caused from rain and dirt, lengthening the time interval between gantry crane overhaul and prolonging the service life of the gantry crane.

My invention's mounting plates settle the gantry crane directly into a tie-down after removal from the aircraft carriers launch trough negating the opportunity to further damage the gantry crane and the aircraft carrier flight deck from human error during the removal and loading process. The design used to tie-down the gantry crane immobilizes the gantry crane during shipping, and virtually eliminates shifting during transportation.

My invention has fork lifting pockets incorporated into structural steel base frame, a corrosion resistant, ridged shipping cover that protects the object, such as but not limited to, the U.S. Navy's steam tube gantry cranes. Additionally, said cover has a moisture barrier reservoir vent filter breather and a gasket to seal the cover at the underside perimeter where said cover contacts the base frame.

Another advantage of the present invention is amount of space saved when the gantry cranes are stored. Because the gantry pallet can be vertically stacked, the footprint of 30 gantry cranes' in my gantry pallets is greatly reduced.

BRIEF DESCRIPTION OF THE DRAWINGS

FIG. 2 also has a cut away view showing the underside perimeter gasket, which is also depicted, enlarged as FIG. 2*a*.

DETAILED DESCRIPTION

Figure 1:
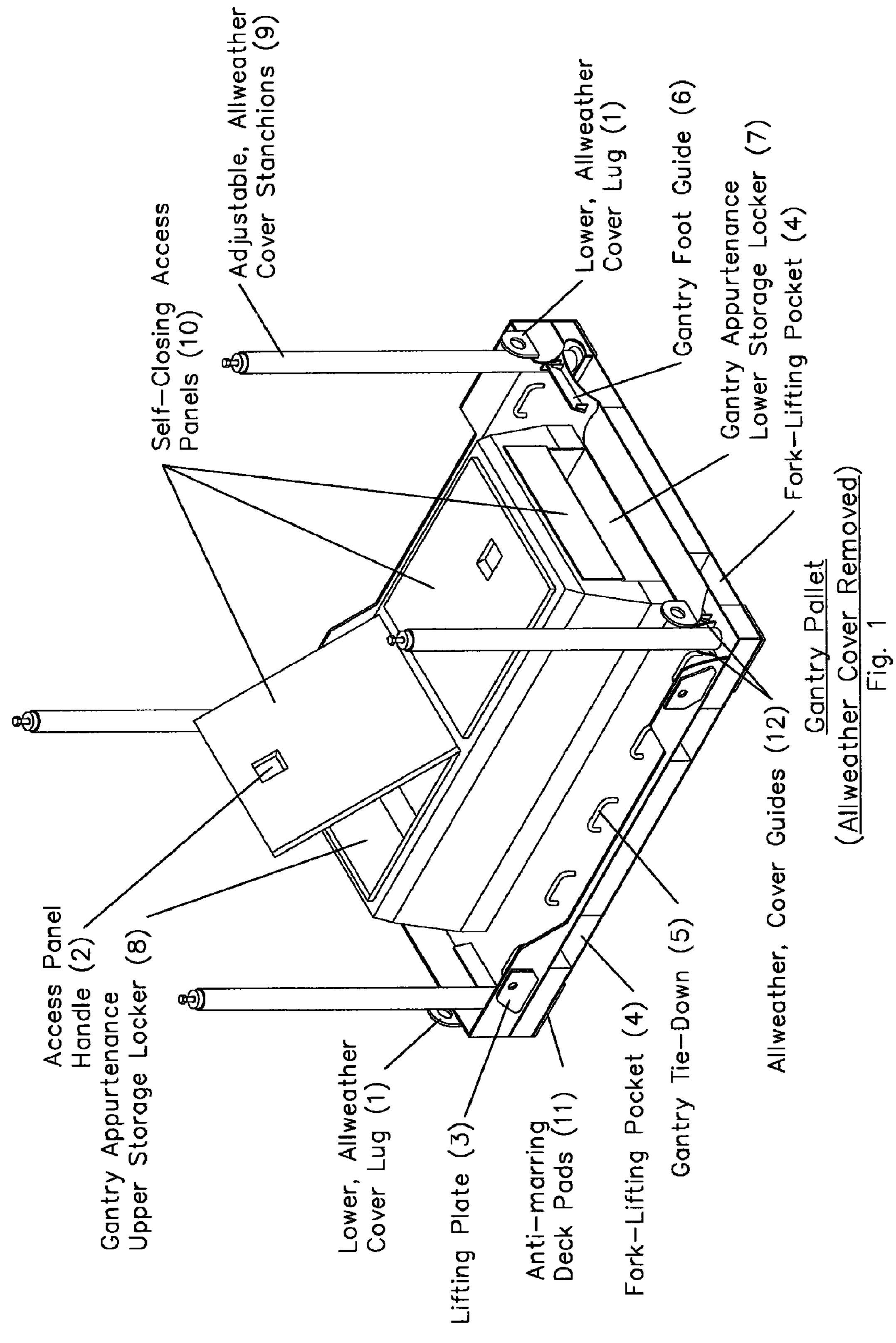
FIG. 1 is a perspective view of the Gantry Pallet in accordance with the teachings of the invention with Gantry Pallet in the open position. Also depicted are cut away areas required to show the Allweather cover guides, the Gantry foot guides and the adjustable, Allweather cover stanchions receiving cup. Note: As a matter of national security, the gantry crane and its many appurtenances are not shown.

Turning first to FIG. 1 it will be seen that the gantry pallet produced in accordance with the teachings of this invention may be generally described as a frame, protruding proximate port and starboard, running forward and aft of centerline are a plurality of gantry tie-downs (5) for use, but not limited to, U.S. Navy's steam tube gantry cranes, a plurality of parallel mounted allweather cover guides (12) and gantry foot guides (6). Adjustable allweather cover stanchions (9) and a plurality of anti-marring deck pads (11). Protruding from and proximate the port and starboard end of the gantry pallet frame forward and aft of centerline are a plurality of lifting plate(s) (3) Furthermore, situated both port to starboard, forward and aft of centerline as well as forward to aft, port and starboard of centerline are a plurality of fork-lifting pocket(s) (4).

Located fore and aft, port and starboard of centerline are a plurality of opposite mounted lower allweather cover lug(s) (1). Upon further viewing and proximate center of the gantry pallet are both an upper gantry appurtenances storage locker (8) and a lower gantry appurtenances storage locker (7). Both upper and lower gantry appurtenances storage locker(s) have self-closing access panels (10).

Figure 2:
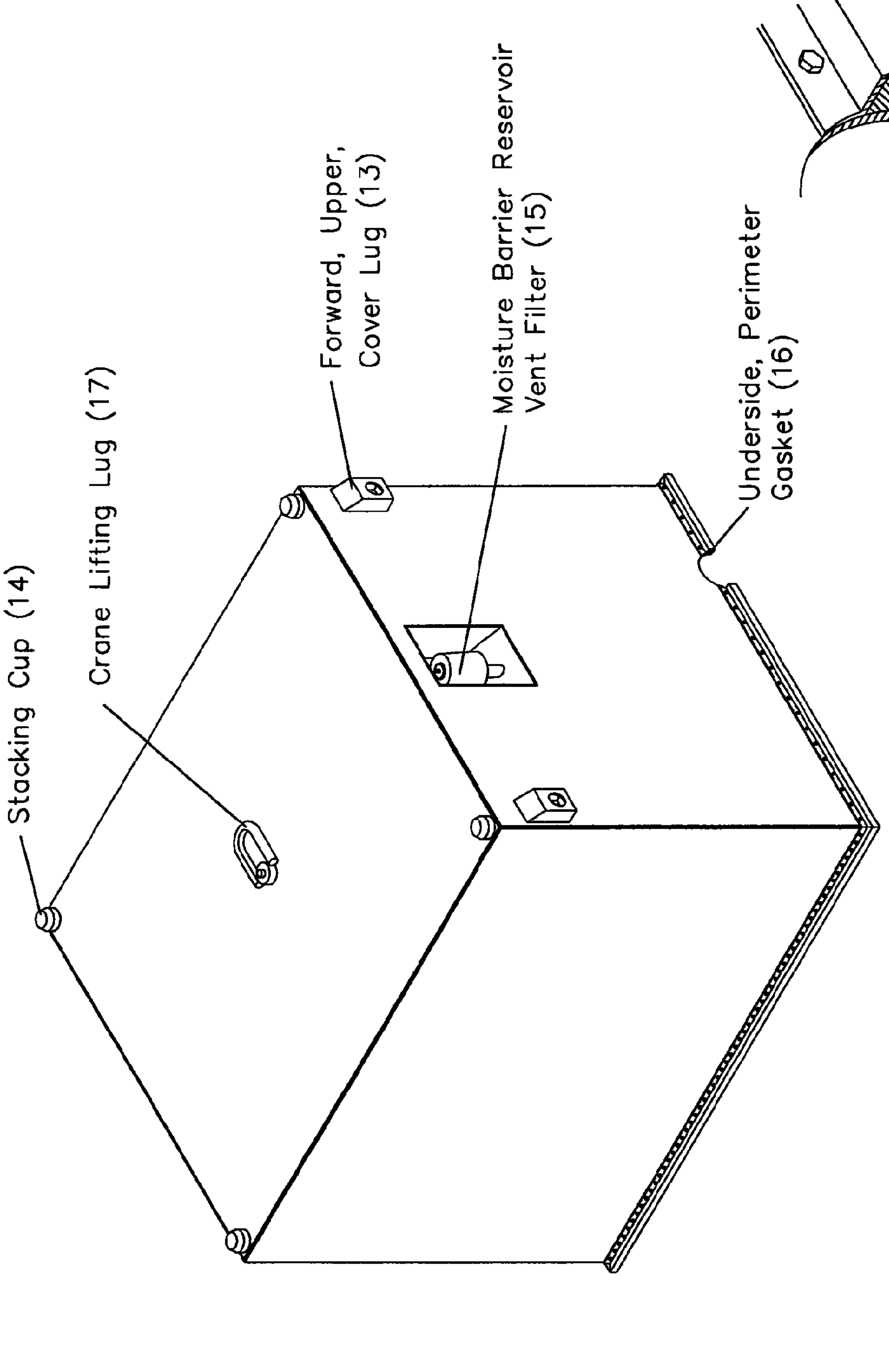
FIG. 2 is a perspective view of the Gantry Pallet's Allweather Cover.
Figure 2A:
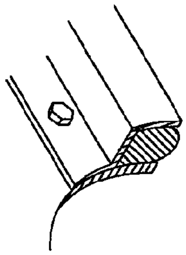

Turning next to FIG. 2, it can be seen that located aft is a moisture barrier reservoir vent filter (15), and forward and aft, port and starboard of centerline are a plurality of upper cover lug(s) (13). Visible on the top of the All weather Cover are a plurality of Stacking cup(s) (14) which aid in centering the gantry pallet when double stacked vertically to conserve space for storage. A cut away and enlargement is included on FIG. 2 as FIG. 2*a*. which depicts the Underside, Perimeter gasket (16) which seals the Allweather cover to the gantry pallet frame during shipping and storage.

Figure 3:
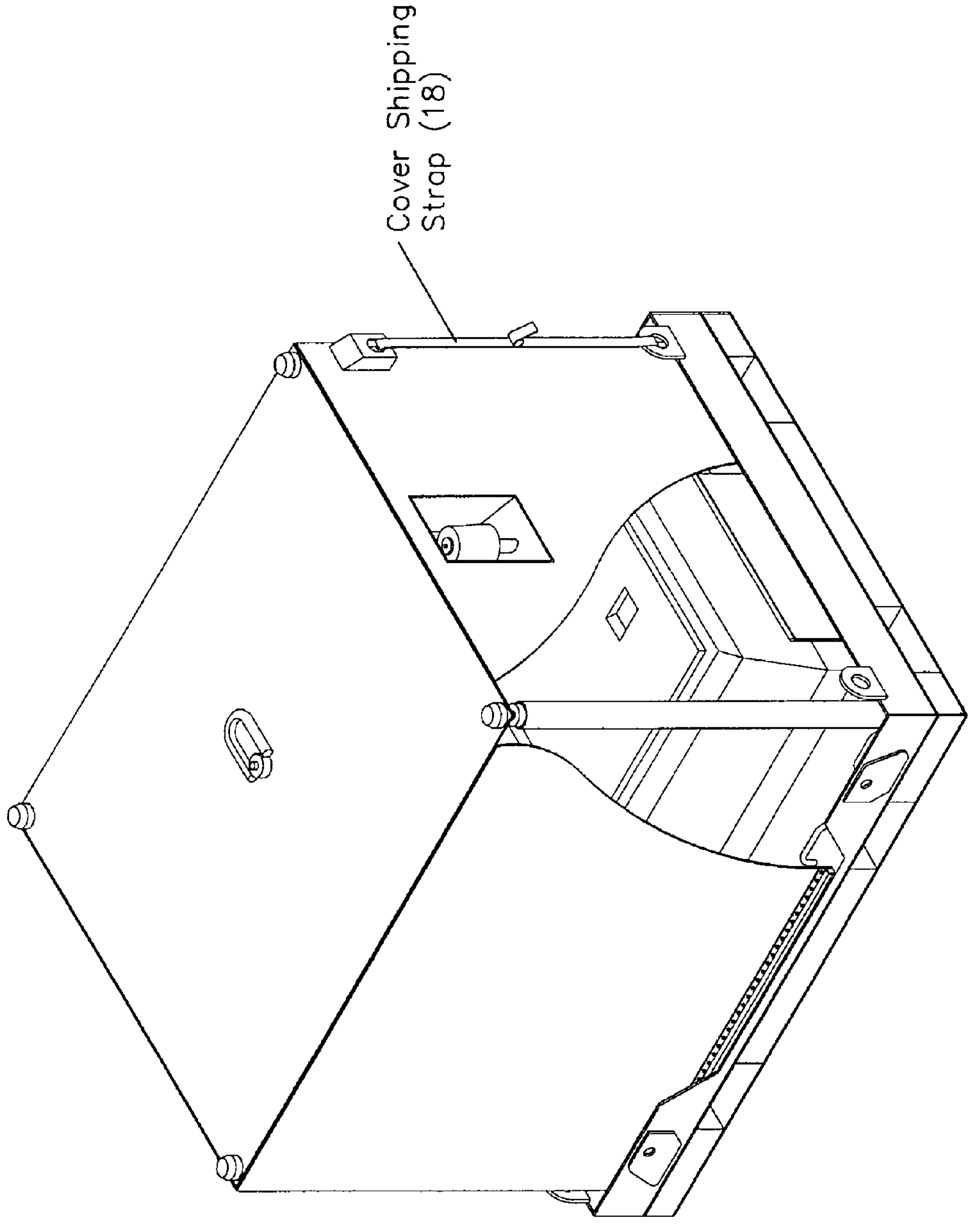
FIG. 3 is a perspective view of the invention Gantry Pallet with the Allweather cover installed and in the shipping position. Also are cut away views showing the gantry pallet upper and lower appurtenances storage lockers in their respective closed positions. Note: As a matter of national security, the gantry crane and its many appurtenances are not shown.

Turning next the FIG. 3 The Allweather cover can be seen wholly protecting the U.S. Navy's steam tube gantry cranes and accompanying appurtenances. NOTE: Gantry crane and appurtenances are not shown for national security. Said cover has a moisture barrier reservoir vent filter (15) that restricts air containing moisture from entering interior said cover. In addition, forward and aft of said cover and said gantry frame, port and starboard of centerline are plurality of cover shipping strap (18), said shipping straps (18) join said cover to said frame. An underside perimeter gasket (16) located along the underside perimeter of the cover, seal said cover to said frame.

However, numerous variations are possible without deviating from and/or exceeding the spirit and scope of the inventive concept. Moreover, many of the above disclosed and other features and functions, or alternatives thereof, may be desirably combined into various other different systems or applications. In addition, numerous presently unforeseen or unanticipated alternatives, modifications, variations or improvements therein may be subsequently made by those skilled in the art, which are also intended to be encompassed by the claims that follow.

Finally, the following parts list for the drawing figures may be found to be of assistance in understanding more fully the concepts on my invention. Shown on FIG. 1 are items numbered 1 through 12. Shown on FIG. 2 are items numbers 13 through 17. Shown on FIG. 3 is item numbered 18.

1. Lower, Allweather Cover Lug.
2. Access Panel Handle.
3. Lifting Plate.
4. Fork-Lifting Pocket.
5. Gantry Tie-Down(s)
6. Gantry Foot Guide.
7. Gantry Appurtenance Lower Storage Locker.
8. Gantry Appurtenance Upper Storage Locker
9. Adjustable, Allweather Cover Stanchions.
10. Self-Closing Access Panel(s)
11. Anti-marring Deck Pads.
12. Allweather, Cover Guide(s).
13. Upper, Cover Lug.
14. Stacking cup.
15. Moisture Barrier Reservoir Vent Filter.
16. Underside, Perimeter Gasket.
17. Crane Lifting Lug.
18. Cover Shipping Strap(s).

What is claimed is:

1. A portable and vertically stackable palletizing device for use on aircraft carriers, comprising:
- a sealable cover;
- a base plate;
- a plurality of opposable, adjustable, vertical stanchions attached to said base plate;
- said base plate comprising at least one lower self-closing access paneled storage locker and at least one upper self-closing access paneled storage locker;
- said base plate further comprising at least one mounting guide, wherein said mounting guide is configured to receive a steam tube gantry crane or other item to be transported;
- said base plate including at least one lifting plate and an underside perimeter mounted anti-marring deck pad; and
- at least two perpendicular facing lifting pockets in said base plate.

2. The palletizing device of claim 1, wherein said base plate comprises a receiving area;

said sealable cover comprises an all-weather cover underside perimeter gasket and is supported by said plurality of stanchions;

said base plate further comprises at least one lower all-weather cover lug;

said sealable cover includes at least one upper cover lug; wherein said at least one lower lug is attachable to said at least one upper lug when said sealable cover is in use; and a lifting lug positioned on said sealable cover.

* * * * *